United States Patent
Lemelin et al.

(10) Patent No.: US 12,078,266 B2
(45) Date of Patent: Sep. 3, 2024

(54) SAMPLE INJECTION DIAPHRAGM VALVE

(71) Applicant: APN INC., Quebec (CA)

(72) Inventors: Simon Lemelin, Quebec (CA); Joël Lessard, Quebec (CA)

(73) Assignee: APN Inc., Quebec (CA)

( * ) Notice: Subject to any disclaimer, the term of this patent is extended or adjusted under 35 U.S.C. 154(b) by 569 days.

(21) Appl. No.: 17/422,993

(22) PCT Filed: Feb. 7, 2019

(86) PCT No.: PCT/CA2019/050158
§ 371 (c)(1),
(2) Date: Jul. 14, 2021

(87) PCT Pub. No.: WO2020/160634
PCT Pub. Date: Aug. 13, 2020

(65) Prior Publication Data
US 2022/0074504 A1    Mar. 10, 2022

(51) Int. Cl.
*F16K 7/16*    (2006.01)
*G01N 30/20*    (2006.01)

(52) U.S. Cl.
CPC ............... *F16K 7/16* (2013.01); *G01N 30/20* (2013.01); *G01N 2030/201* (2013.01); *G01N 2030/205* (2013.01)

(58) Field of Classification Search
None
See application file for complete search history.

(56) References Cited

U.S. PATENT DOCUMENTS

| RE30,989 E | 7/1982 | Bake et al. |
| 4,597,412 A * | 7/1986 | Stark .................. F16K 7/16 251/331 |

(Continued)

FOREIGN PATENT DOCUMENTS

| DE | 102012111193 B3 | 5/2014 |
| EP | 1880131 A2 | 1/2008 |

(Continued)

OTHER PUBLICATIONS

Chinese Office Action; China National Intellectual Property Administration; Chinese Patent Application No. 201980091134.X; Jul. 30, 2023; 13 pages.

(Continued)

*Primary Examiner* — Daniel S Larkin
(74) *Attorney, Agent, or Firm* — Taft Stettinius & Hollister LLP

(57) ABSTRACT

A sample injection diaphragm valve is provided, as well as a plunger assembly and a method of operating the valve. The valve includes a valve head and a valve body. The valve includes a diaphragm positioned between the valve head and the valve body. The diaphragm has a process groove seated in the recess of the valve body for circulating fluid therein. Plungers are slidably fitted in plunger passages of the valve body. Each plunger is movable between a closed position wherein the plunger deforms the diaphragm and blocks fluid circulation between two process ports, and an open position wherein the plunger is retracted away from the diaphragm, thereby allowing fluid to circulate in the process groove. The plungers have linear lips extending across the top face of the plungers for pressing against the diaphragm when in the closed position.

20 Claims, 15 Drawing Sheets

(56) References Cited

U.S. PATENT DOCUMENTS

| | | | |
|---|---|---|---|
| 8,104,506 B2 * | 1/2012 | Gamache | F16K 7/12 251/331 |
| 2006/0185419 A1 | 8/2006 | Gamache et al. | |
| 2009/0152481 A1 | 6/2009 | Gamache et al. | |
| 2012/0025120 A1 * | 2/2012 | Gamache | F16K 7/16 251/321 |

FOREIGN PATENT DOCUMENTS

| | | |
|---|---|---|
| EP | 2331858 A1 | 6/2011 |
| EP | 2972290 A1 | 1/2016 |
| JP | S48-26180 Y | 7/1973 |
| JP | 2004-144243 A | 5/2004 |
| JP | 2015-507159 A | 3/2015 |
| WO | 2008089583 A1 | 7/2008 |
| WO | 2009006742 A1 | 1/2009 |
| WO | 2010025570 A1 | 3/2010 |
| WO | 2010063125 A1 | 6/2010 |
| WO | 2010111791 A1 | 10/2010 |
| WO | 2014138966 A1 | 9/2014 |

OTHER PUBLICATIONS

Office Action; Japan Patent Office; Japanese Patent Application No. 2021-569582; Aug. 1, 2023; 5 pages.

International Search Report; Canadian Intellectual Property Office; International Application No. PCT/CA2019/050158; Oct. 10, 2019; 5 pages.

Written Opinion of the International Searching Authority; Canadian Intellectual Property Office; International Application No. PCT/CA2019/050158; Oct. 10, 2019; 3 pages.

Extended European Search Report; European Patent Office; Patent Application No. 19914411.4; Aug. 22, 2022; 11 pages.

AFP Analytical Flow Products; High Performance GC Diaphragm Valve; 32 pages; Copyright 2015 Analytical Flow Products.

Crane; Saunders Industrial Diaphragm Valves; 49 pages; Copyright 2004 Crane Process Flow Technologies Ltd.

Japanese Office Action; Japan Patent Office; Japanese Patent Application No. 2021-569582; Jan. 24, 2023; 4 pages.

* cited by examiner

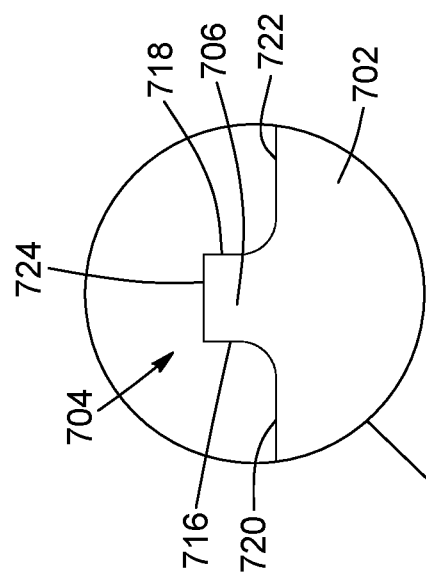
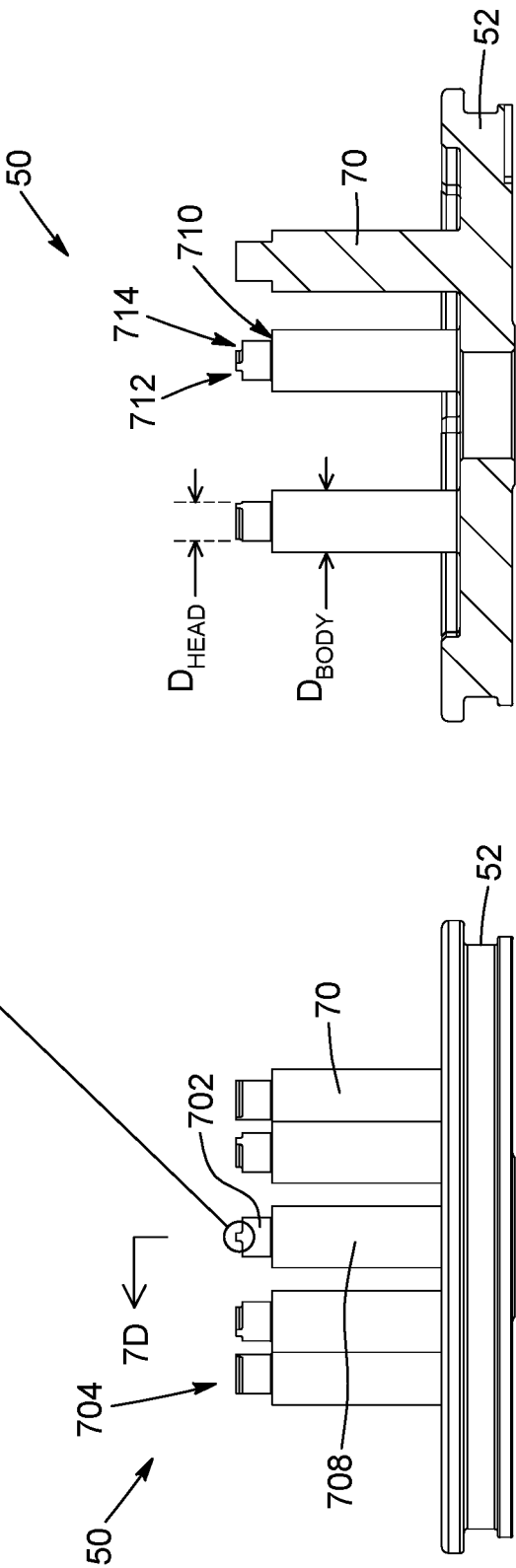
FIG. 7C  FIG. 7D  FIG. 7E

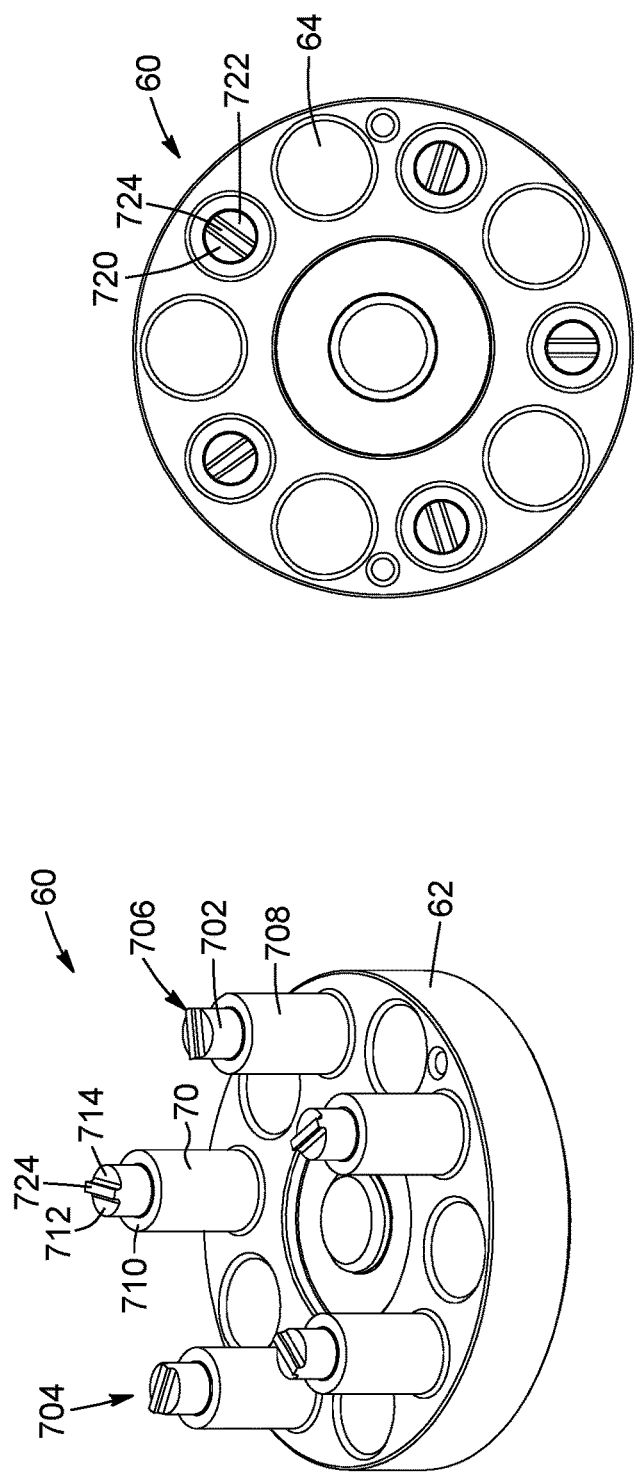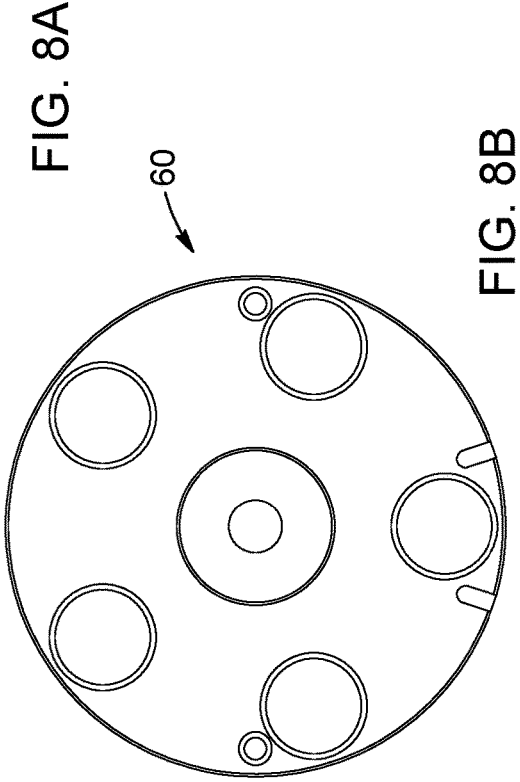
FIG. 8A
FIG. 8B
FIG. 8

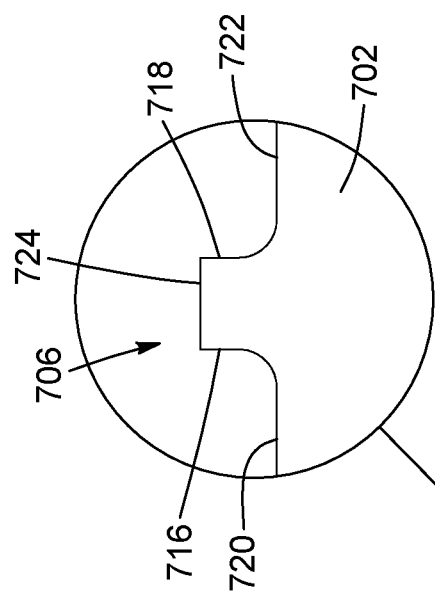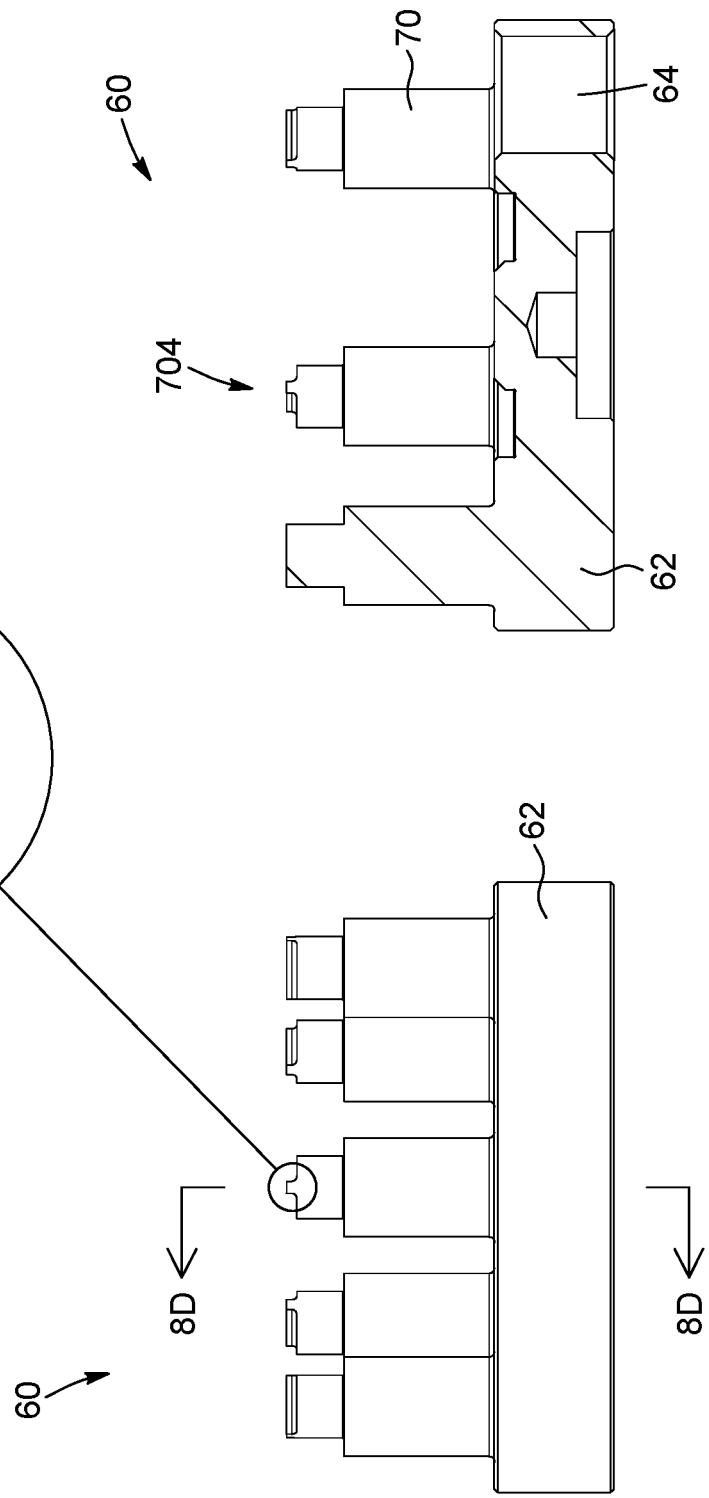

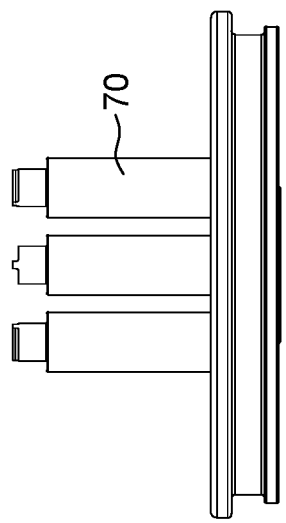
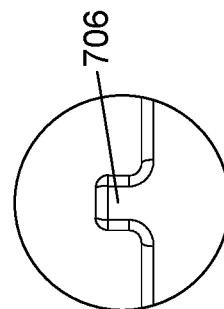
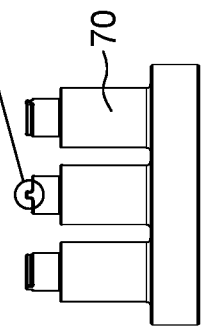
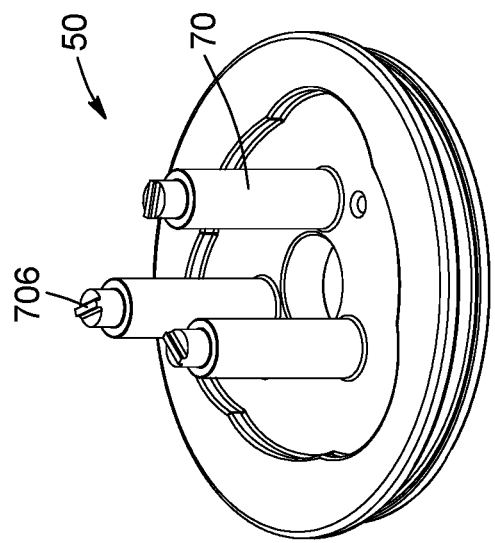
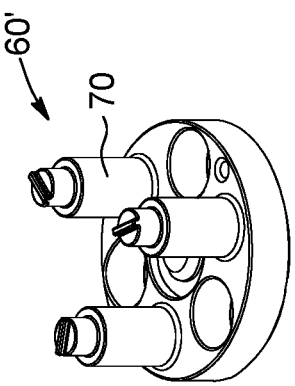

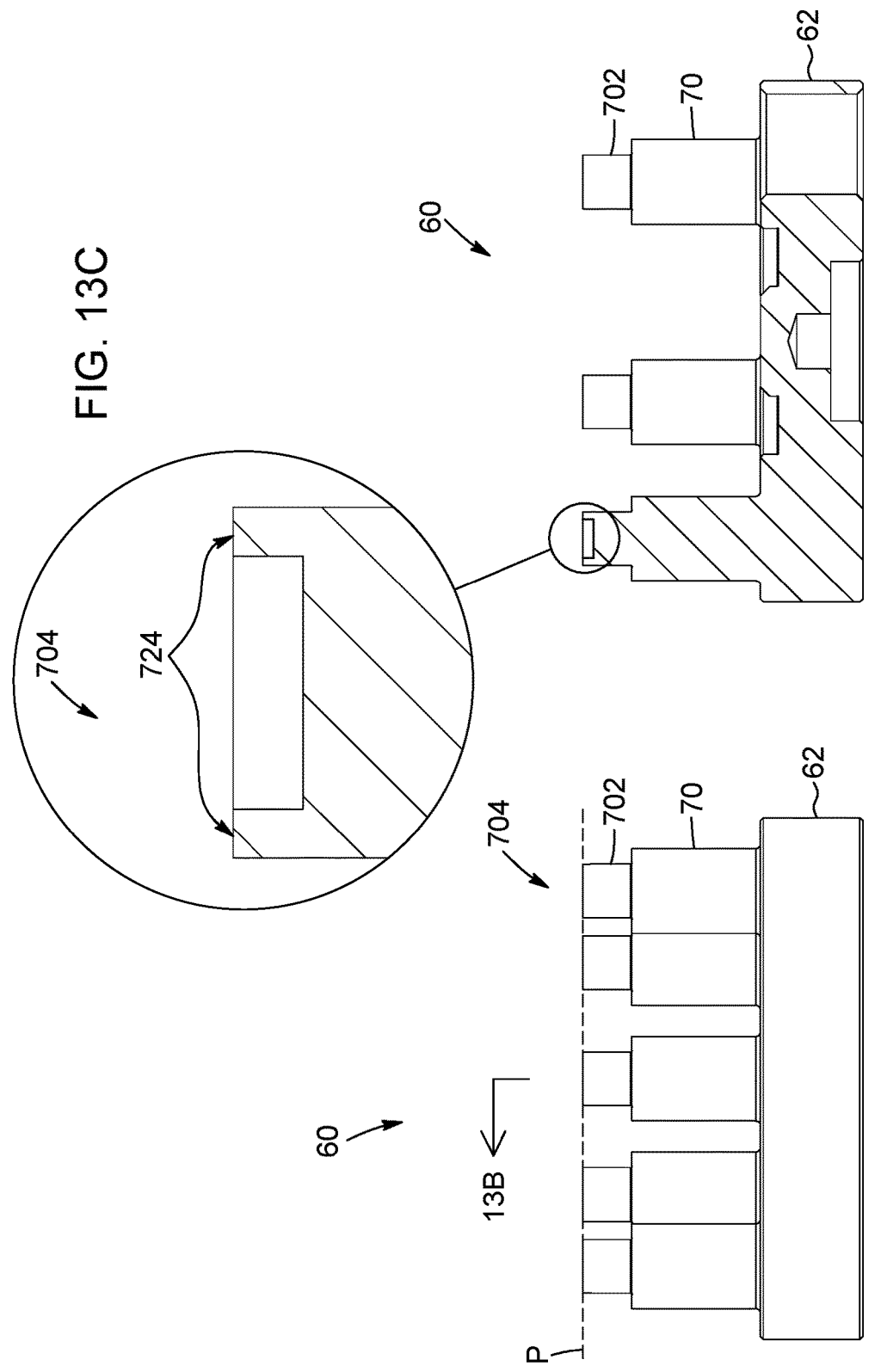

SAMPLE INJECTION DIAPHRAGM VALVE

CROSS REFERENCE TO RELATED APPLICATIONS

This application is a U.S. National Phase of International PCT Application No. PCT/CA2019/050158 filed Feb. 7, 2019, the contents of which are incorporated herein by reference in their entirety.

FIELD OF THE INVENTION

The present invention generally relates to gas chromatography and sample analysis and is more particularly directed to an improved diaphragm valve.

BACKGROUND

Chromatographic systems rely on the use of valves to allow reproducible sample introduction and various column switching schemes. Diaphragm-sealed type valves are commonly used in such systems. A typical diaphragm-sealed valve includes a valve head having a plurality of ports opening on an interface. Each port is linked to a passage in the valve head to which various analytical fitting and tubing may be connected. A diaphragm valve also includes a valve body having an interface opposite that of the valve head. The diaphragm, generally made of a polymer material, is compressed between the opposite interfaces of the valve body and valve head. A main recess is usually provided in the interface of the valve body, in which sits a matching recess in the diaphragm, allowing some clearance for fluid circulation between adjacent ports. This communication between ports can be stopped through the use of plungers slideably mounted in the valve body. Each plunger can press on the diaphragm between two adjacent ports, and therefore prevent fluid communication therebetween.

One issue with prior art diaphragm valves for gas chromatography is when plungers do not press properly against the diaphragm, the path between two ports is not completely closed, creating fluid leaks between ports, and affecting the sample analysis results. Another common issue is unwanted fluid restriction occurring along the path followed by fluid circulating in the valve.

There is therefore a need for a diaphragm-sealed type valve which alleviates at least some of the drawbacks of the prior art.

SUMMARY OF THE INVENTION

According to a first aspect, a sample injection diaphragm valve for channeling fluid is provided. The valve preferably includes a valve head, a valve body, a diaphragm and, optionally, a valve bottom cap. The valve head comprises a plurality of process conduits extending therethrough. Each of the process conduits ends in a process port. The valve body faces the valve head. The valve body comprises a body interface provided with a recess. The valve body also comprises plunger passages extending therein, the plunger passages opening on the recess. The diaphragm is positioned between the valve head and the valve body and has a process groove seated in the recess of the valve body, for circulating fluid therein. A normally closed plunger assembly and a normally open plunger assembly are provided within the valve body, each assembly comprising plungers slidably fitted in the plunger passages of the valve body. Each plunger is movable between a closed position, wherein the plunger deforms the diaphragm and blocks fluid circulation between two of the process ports, and an open position, wherein the plunger is retracted away from the diaphragm, allowing fluid to circulate.

In possible embodiments, the plungers have the top face of their head provided with a linear lip, or gate, protruding thereon and extending across the top face. At least a portion of the linear lips press against the diaphragm when the plungers are in the closed position, and preferably, only said linear lip or gate contacts the diaphragm when in the closed position.

In possible embodiments, the plungers have a plunger body and a plunger head, and the plunger head extends from the plunger body. The plunger body and the plunger head are both substantially cylindrical in shape, with the plunger head having a narrower diameter than a diameter of the plunger body.

In possible embodiments, the plungers have a first circular shoulder formed between the main body and the head of the plunger, and second and third shoulders, formed between the top face of the head of the plunger and opposite sidewalls of the protruding linear lip. In a possible implementation, the top face of each plunger comprises two semicircular areas and one rectangular area on said protruding linear lip, said rectangular area being raised and spaced away from the two semicircular areas, and corresponding to the diaphragm contacting surface.

The process groove formed in the diaphragm is preferably annular or circular and has a groove width. The protruding linear lip extending on top of the plunger may have a length corresponding to the width of the process groove. In other implementations, the lip may have a length that is smaller or greater than the width of the groove.

Preferably, in the closed position, the protruding linear lip of each plunger presses a contact surface on the bottom surface of the diaphragm and deforms the diaphragm such that areas of the diaphragm on each side of the contact surface extend on both sides of the protruding lip, in line or facing the recessed areas of the top face of the plunger head. Still preferably, in the closed position, contact surfaces formed between the plungers and the bottom surface of the diaphragm extend linearly and radially relative to a central axis of the valve. Still preferably, the linear lip of each plunger, when in the closed position, forms a single gate or sidewall between two adjacent process ports, said gate or sidewall radially extending relative to a central axis of the valve. The linear lip of each plunger, when in the closed position, preferably creates a contact surface with a bottom surface of the diaphragm, where the contact surface is narrower than the cross-sectional area corresponding to the head of the plunger. In possible embodiments, the linear lip has a flat diaphragm-contacting surface, while in other embodiments, the linear lip may have a concave, convex or double-wall shape.

According to another aspect of the invention, a plunger assembly for a sample injection diaphragm valve is provided. The plunger assembly includes plungers sized and configured to slidably fit in plunger passages of a sample injection diaphragm-sealed valve. In use, each plunger is movable between a closed position wherein the plunger deforms the diaphragm and blocks fluid circulation between two of the process ports and an open position wherein the plunger is retracted away from the diaphragm, allowing fluid to circulate. Preferably, the plungers of the assembly each has a top face provided with a linear lip protruding thereon and extending across the plunger, the linear lip pressing against the diaphragm when the plunger is in the closed position. The plunger assembly may be one of a normally closed plunger assembly and a normally open plunger assembly. The assembly may include a disk plate, with the plungers extending from the disk plate.

In some embodiments, the disk plate and corresponding plungers can be integrally formed as a single component, and the plunger heads may have a planar, flat top surface.

Preferably, in some implementation of the plunger assembly, a lip formed on the top face of each plunger as a diaphragm-contacting surface which is smaller than a peripheral area of the plunger head.

According to another aspect, a method of operating a sample injection diaphragm valve is provided. The method comprising the steps of providing the valve as described above, and of actuating the valve by moving the normally closed plunger assembly toward an open configuration, and simultaneously moving the normally open plunger assembly toward a closed configuration; the plungers of the normally open plunger assembly compressing the diaphragm against the cap valve along respective contact areas which are substantially linear, and which extend across the groove width. The method may include a step of circulating fluid from at least one process conduit in the process groove of the diaphragm toward at least another one of the process conduits, and a step of deactivating the valve, the normally closed plunger assembly returning in the closed configuration, and the normally open plunger assembly returning in the open configuration. The plungers of the normally closed plunger compress the diaphragm against the cap valve along respective contact areas which are substantially linear, and which extend across the groove width. Preferably, the plungers deforms the diaphragm such that areas of the diaphragm on each side of the contact surface extend downwardly, facing recessed areas of a top face of heads of the plunger. The contact areas formed between the plungers and a bottom surface of the diaphragm preferably extend linearly and radially relative to a central axis of the valve.

Other features and advantages of the embodiments of the present invention will be better understood upon reading of preferred embodiments thereof with reference to the appended drawings.

BRIEF DESCRIPTION OF THE DRAWINGS

FIG. 7C is a side view of the assembly of FIG. 7.

FIG. 7D is a cross-sectional view of the assembly, taken along lines 7D-7D in FIG. 7C.

FIG. 7E is an enlarged view of the head of a plunger of the assembly.

FIG. 8 is a perspective view of a normally closed plunger assembly, according to a possible embodiment.

FIG. 8A is a top view of the assembly of FIG. 8.

FIG. 8B is a bottom view of the assembly of FIG. 8.

FIG. 8C is a side view of the assembly of FIG. 8.

FIG. 8D is a cross-sectional view of the assembly, taken along lines 8D-8D in FIG. 8C.

FIG. 8E is an enlarged view of the head of a plunger of the assembly.

FIG. 9 is a perspective view of a normally open plunger assembly, according to another possible embodiment.

FIG. 9A is a side view of the assembly of FIG. 9.

FIG. 10 is a perspective view of a normally closed plunger assembly, according to another possible embodiment.

FIG. 10A is a side view of the assembly of FIG. 10.

FIG. 10B is an enlarged view of the head of the plunger of FIG. 10A, with bevelled edges.

FIG. 13A is a side view of a normally closed plunger assembly, according to another possible embodiment.

FIG. 13B is a cross-sectional view of the assembly of FIG. 13A, taken along lines 13B-13B in FIG. 13A.

FIG. 13C is an enlarged view of a plunger head, according to a possible embodiment.

Figure 1:
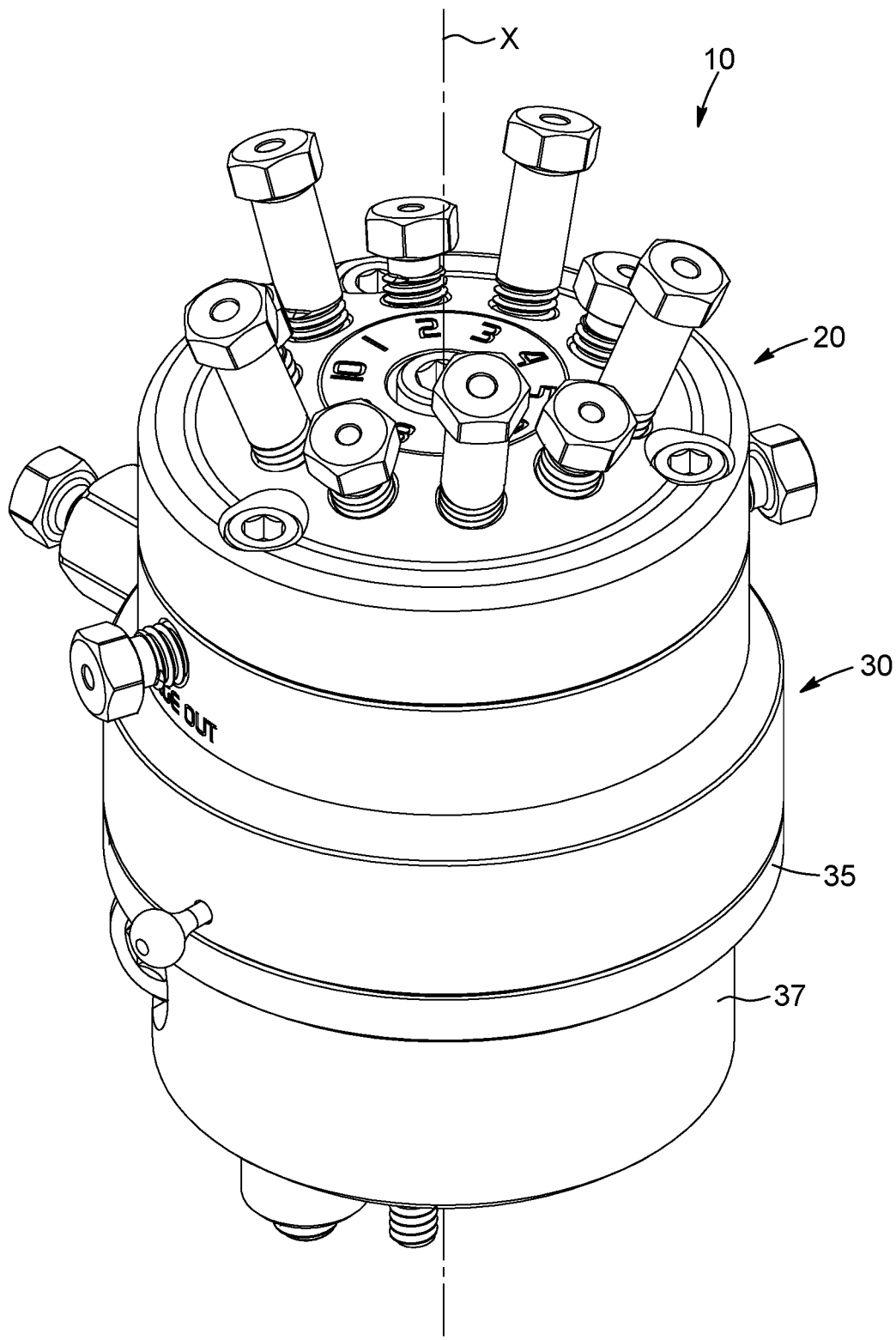
FIG. 1 is a top perspective view of a sample injection diaphragm valve, according to a possible embodiment.

It should be noted that the appended drawings illustrate only exemplary embodiments of the invention and are therefore not to be construed as limiting of its scope, for the invention may admit to other equally effective embodiments.

DESCRIPTION OF PREFERRED EMBODIMENTS

The present invention generally relates to plungers and plunger assemblies for diaphragm-sealed valves, for example valves suitable for gas chromatography.

In the following description, similar features in different embodiments have been given similar reference numbers. For the sake of simplicity and clarity, namely, so as to not unduly burden the figures with unneeded references numbers, not all figures contain references to all the components and features; references to some components and features may be found in only one figure, and components and features of the present disclosure which are illustrated in other figures can be easily inferred therefrom. Throughout the present description, and unless stated otherwise, positional descriptors such as "top" and "bottom" should be taken in the context of the figures and should not be considered as being limitative.

With reference to FIGS. 1, 2, 3, 3A, 4, 4A and 4B, an exemplary sample injection diaphragm valve 10 is illustrated. The valve 10 includes a valve head 20; a valve body 30; a valve bottom cap 35; a valve mounting collar 37; a diaphragm 40, compressed between the valve head 20 and the valve body 30; and plunger assemblies 50, 60. Other embodiments of sample injection diaphragm valves may include more or fewer components; for example, the bottom cap 35 and the mounting collar 37, can be replaced by other equivalent structures holding the plunger assemblies 50, 60 in the valve body 30. Other components may also be provided in the valve, such as screws, springs, seals, pistons and the like. In the embodiments illustrated, the valve is pneumatically actuated, and comprises the valve bottom cap 35 to form a closed chamber for the actuating gas. However, in other implementations, it is possible to actuate the plungers electrically, and in such cases, the valve bottom cap may not be required.

Referring to FIGS. 2-4B, the valve head 20 has an interface 206 and a plurality of process conduits 202 extending through the valve head 20. In the illustrated embodiment, the valve includes ten process conduits, but other embodiments of the valve can include a different number of conduits, depending on the application. The valve head interface 206 is flat and smooth and is in contact with the diaphragm 40 when the valve is assembled. Each process conduit 202 ends in a process port 204 opening at the valve head interface 206. The process ports 204 are preferably circularly arranged on the valve head interface. Best shown in FIG. 3A, each of the process conduits 202 are preferably formed by a larger threaded hole for receiving tubing connections and a smaller fluid passage ending in the process port 204. In this embodiment, the valve head 20 has a cylindrical shape and is made of electro-polished stainless steel, as an example only. The alignment of the valve head 20 with the valve body 30 is ensured by dowel pins 82. Of course, other arrangements for holding the valve head 20 to the valve body 30 can be considered. Other materials, for example ceramic or various types of polymers, may be used as material for the valve head 20. Shapes other than a cylindrical one may also be considered. Of course, other embodiments of the valve head may include 4, 8, 10, 12 or any other convenient number of process ports.

Still referring to FIGS. 2-4B, the valve body 30 also has an interface 302, which faces the valve head interface 206 when the valve 10 is assembled. The valve body interface 302 is provided with a main recess 304, preferably having a circular outline. The process ports 204 of the valve head 20 are in line with the recess 304 when the valve elements are assembled, and the valve is ready for use, as best shown in FIG. 3A. The valve body 30 also includes a plurality of plunger passages 306, two being shown in FIGS. 4A and 4B. Each plunger passage 306 extends in the valve body 30 and opens at one end in the recess 304, between two of the process ports 204. The other ends of the passages 306 open in a valve body cavity that houses the plunger assemblies. The valve body is also provided with a first set of screw holes for receiving socket head cap screws that hold the valve body to the valve head and a second set of screw holes for receiving the socket head cap screws that hold the valve body 30 to the bottom cap 35. Of course, other arrangements could be considered for affixing the valve body 30 to the valve head 20 and valve bottom cap 35.

Figure 2:
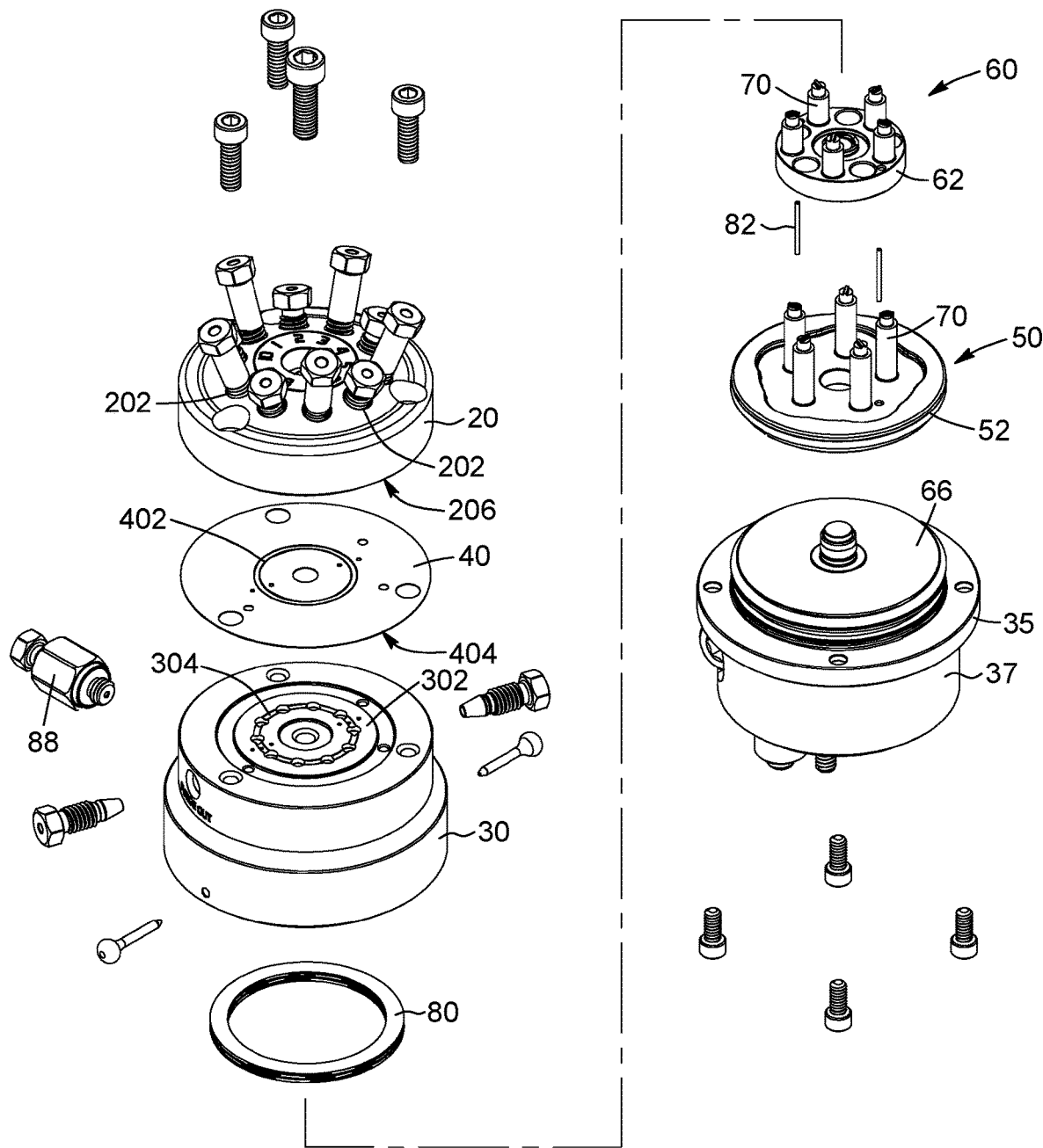
FIG. 2 is a partially exploded view of the valve of FIG. 1.
Figure 3:
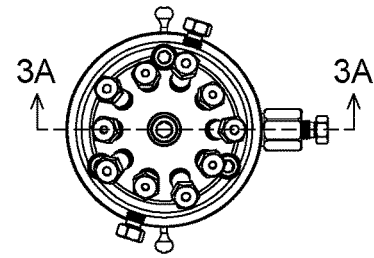
FIG. 3 is a top view of the valve of FIG. 1.
Figure 3A:
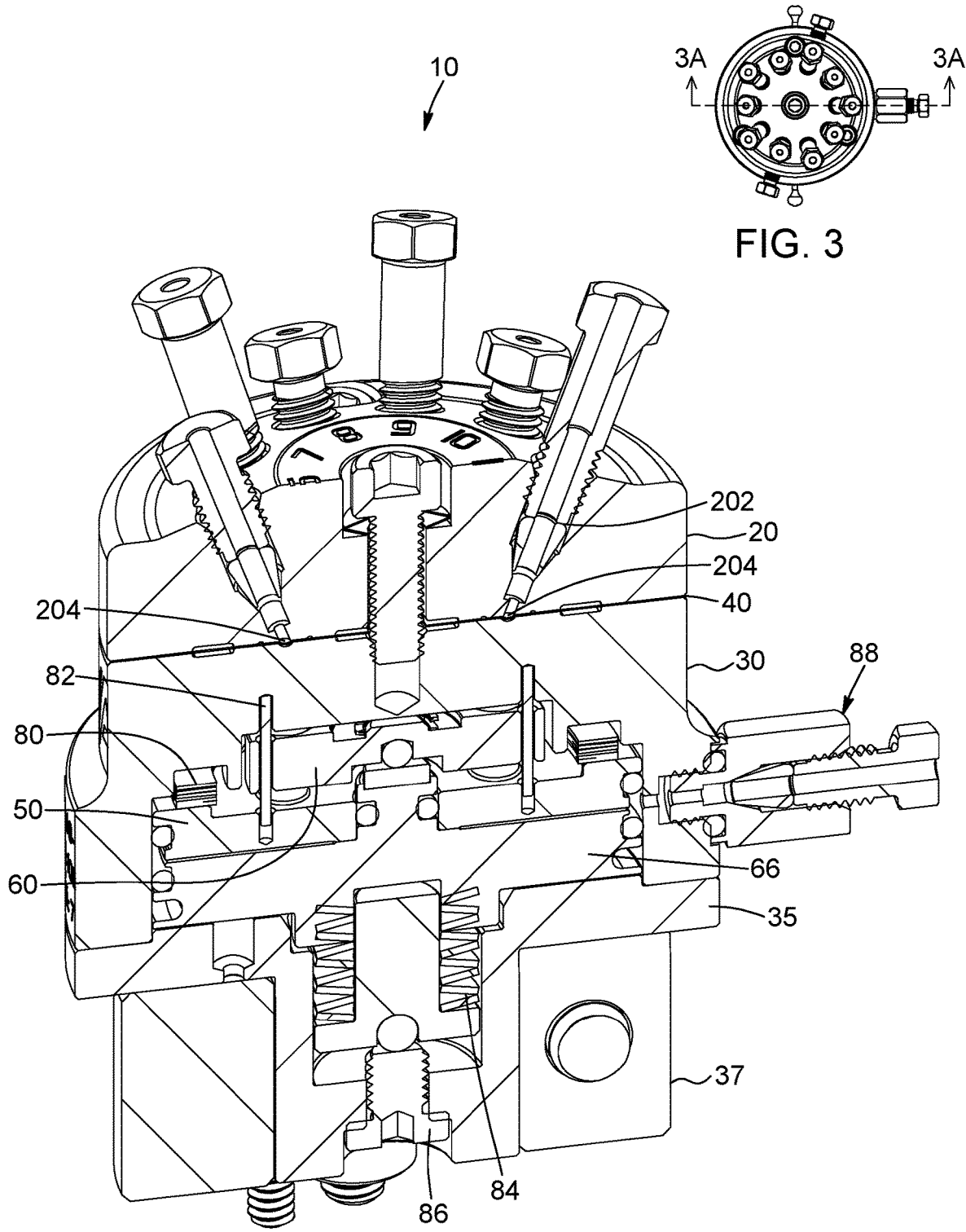
FIG. 3A is a cross-sectional view of the valve, taken along lines 3A-3A in FIG. 3, showing two ports opening on the upper surface of the diaphragm.

Referring to FIG. 2, a possible embodiment of the diaphragm 40 is shown. The diaphragm 40 has a first surface facing the bottom interface 206 of the valve head 20, and a second surface facing the top interface of valve body 30. The diaphragm 40 is disposed between the interfaces of the valve head and valve body, when the valve is assembled and ready for use. The diaphragm has a preformed deformation or process groove 402 lying within the main recess 304 of the valve body 30. The top surface of the diaphragm 40 defines with the interface 206 of the valve head 20 a communication channel between the process ports 204.

Figures 4, 4A:
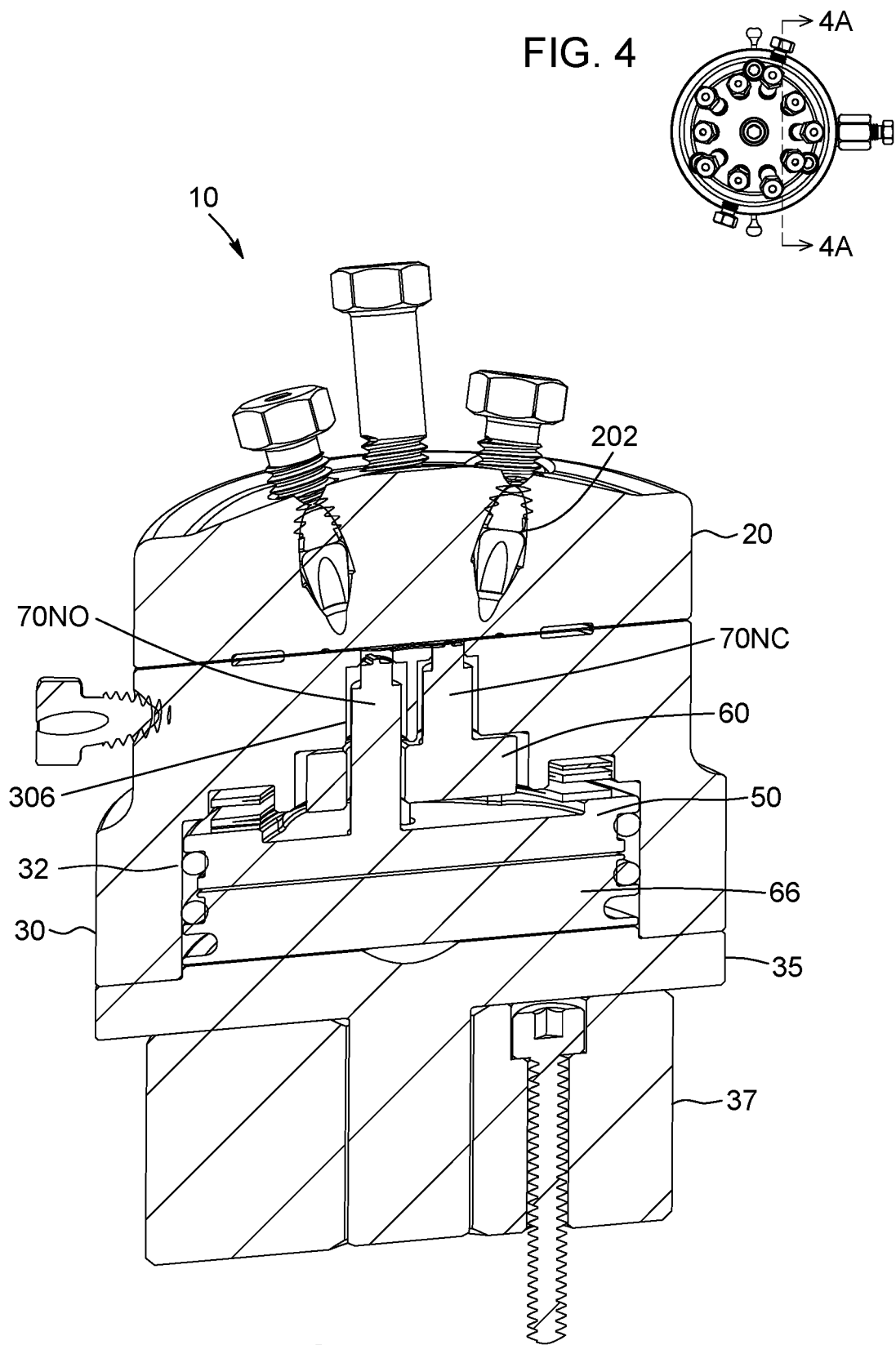
FIG. 4 is a top view of the valve of FIG. 1.
FIG. 4A is another cross-sectional view of the valve of FIG. 1, taken along lines 4A-4A of FIG. 4. The valve is unactuated, showing a normally closed plunger and a normally open plunger.
Figure 4B:
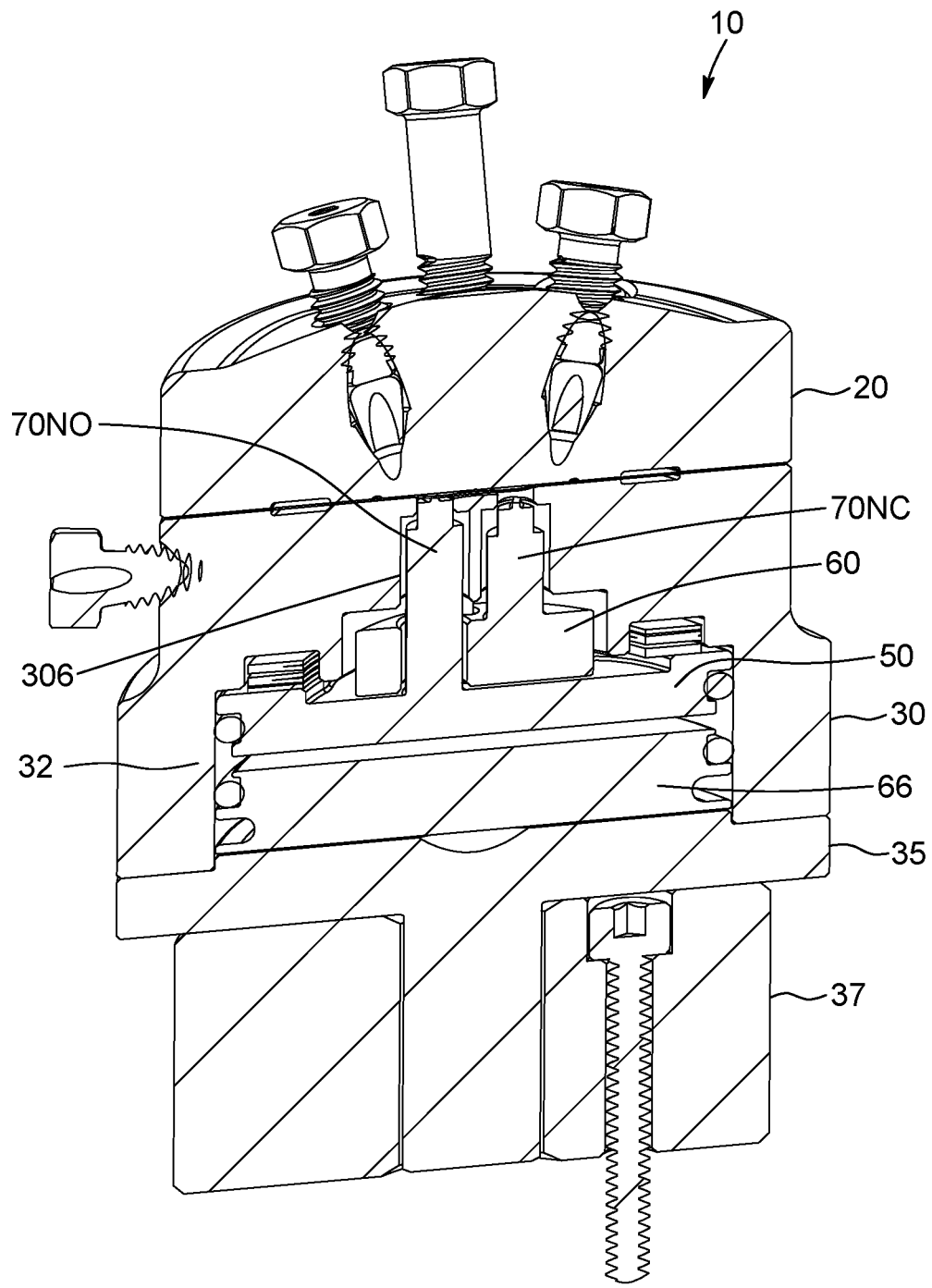
FIG. 4B is a cross-sectional view of the valve of FIG. 4 while actuated, with the normally closed plunger lowered and the normally open plunger pushed against the diaphragm.

The illustrated embodiment in FIGS. 1 to 8 show a ten-plunger valve, two of which are shown in FIGS. 4A and 4B. Of course, the present invention may be applied to diaphragm-sealed valves having a different number of plungers. For example, the plunger assemblies illustrated in FIGS. 9 and 10 each comprise three plungers, to form a six-plunger valve. The term "plunger" is understood to mean a mechanical component driven by or against a mechanical force or fluid pressure. The construction of plungers 70 according to embodiments of the present invention will be explained further below. Each plunger 70 is slideable in a corresponding passage 306 of the valve body 30. Preferably, the diameter of a passage 306 is slightly larger than that of its corresponding plunger 70.

As illustrated in FIG. 4A, the plungers 70 are preferably of two types, designated as "normally closed" (NC) and "normally open" (NO). In typical chromatography applications, the plungers 70 of a given type are actuated together, so that they are either all in the closed position or all in the open position. As their names indicate, the normally closed plungers are biased towards the closed position, whereas the normally opened plungers are biased towards the open position. In the illustrated embodiment, the NO and NC plungers are part of a normally open plunger assembly 50 and a normally closed plunger assembly 60. Each assembly 50, 60 includes a disk plate 52, 62, from which the plungers protrude/extend. While in the illustrated embodiments, the disk plates 52, 62 and corresponding plungers are integrally formed as single components, in other embodiments, the plungers and disk plates can take other configurations, and can be formed in one or more parts. The plungers for example, can be screwed to the disk plates, and can interact with additional push plates.

Still referring to FIG. 4A, in this particular embodiment, the normally closed plungers 70NC have a length different than the length of the normally open plungers 70NO. A plunger-actuating mechanism preferably includes normally a closed piston 66, which extends within the valve body 30, parallel to the diaphragm 40, and is movable transversally thereto. The normally closed plungers 70NC are operatively connected to the normally closed piston 66. As best shown in FIG. 2, the lower piston 66 has a central protuberance that passes through the assembly 50 and connects to the disk plate 62 of the assembly 60. The plunger-actuating mechanism 32 further includes an upper piston, which in this case corresponds to the disk plate 52 of the normally open plunger assembly 50. A plurality of plunger holes 64 extend across the disk 62 of the assembly 60, for allowing the normally open plungers therethrough. Of course, in other embodiments, it can be considered to invert the stacking order of assemblies 50, 60; such that the normally closed assembly 60 be located underneath the normally open assembly 50. The springs/biasing means would in this case need to be reconfigured accordingly.

In the illustrated embodiment, a Belleville assembly 84, including a Belleville washer stack and a plate, cooperates with the lower piston 66. The force on the Belleville assembly 84 is preferably controlled by a preload adjustment setscrew 86. The Belleville assembly 84 may be replaced by any other biasing means, such as standard springs or polymer bushings.

The upper piston 52 is biased downward by appropriate means. In the illustrated embodiment, wave spring 80 extends from within the valve body 30 over the upper piston or disk plate 52 and applies a downward force thereon when no opposite force is in play. The normally open plungers 70NO are therefore biased towards the open position. In the upward direction, the stroke of the upper piston 52 is limited by a shoulder machined in the valve body 30.

The actuating mechanism is operable for actuating the plungers 70 of both types between their open and closed positions thereof. This can be accomplished in the current embodiment by controlling the distance between the upper and lower pistons 52 and 66. When not actuated, as shown in FIG. 4A, the two pistons 52 and 66 are in contact, as they are pushed towards each other by the Belleville assembly 84 and wave spring 80. The actuating mechanism preferably includes a pneumatic actuator for supplying pressurised gas between the upper and lower pistons 52 and 66 through an actuation gas supply inlet adapter 88. When the valve is actuated, the gas will counterbalance the bias of both pistons 52 and 66 by pushing the upper piston 52 upward, thus sliding the normally open plungers 70NO towards the closed position, and then pushing the lower piston 66 downwards, thus pulling the disk plate 62 downward and retracting the normally closed plungers 70NC towards the open position. Removing the pressurized gas will have the opposite result, due to the biasing effect of the Belleville assembly 84 and wave spring 80.

One possible issue with sample injection diaphragm valves occurs when the diaphragm remains in the way of the fluid path, between process ports. The fluid communication path 412 is the volume defined between the valve head interface 206 and the top surface of the process groove 402 in the diaphragm 40, in which the gas being channeled circulates between two ports. Unwanted deformation or bulging of the diaphragm in fluid communication path 412, when the plungers are retracted from the diaphragm in the open position to let gas flow in the process groove, causes restriction in the valve. Flow restriction or loss occurs when the diaphragm, after having been deformed by a closed plunger to block communication between two ports, does not return to its original shape, when the plunger is retraced away from the diaphragm. The distance between the valve head interface and the bottom surface of the diaphragm process groove 402 being relatively small, such as less than 50 μm, typically between 25 μm and 12 μm, a bulging of the diaphragm in the fluid communication path, even if only of a few μm, such as 5 μm, can be enough to cause flow restriction beyond acceptable specifications. For example, acceptable specification can be of no more than 10 kPA to 20 kPA, and typically no more than 15 kPA, for a fluid flow of 75 ml/min.

When blocking communication paths between two process ports, typical plungers contact and press the diaphragm with their entire top face area, which is typically disk-shaped/circular. In some valves, plungers press against the diaphragm along their periphery only. In both cases though, the area of the diaphragm that is deformed to block fluid in the closed position substantially corresponds to the area of the head of the plunger. The Applicant has found that reducing the contact area between the plunger and the diaphragm allows limiting flow restriction in the valve, while maintaining the leak rate stable, even after several thousands of actuation cycles. Forming a lip or strip 706 on the top face of the plungers, as shown in FIGS. 7 to 11, results in what is believed to be a reduction of the bulging of the diaphragm when plungers are retracted toward their open positions. Surprisingly, even though the sealing/contact area between the plungers and the diaphragm is reduced to a "linear" or "radial" contacting surface, the contact area is sufficient to properly block the fluid path when the plungers are in the closed positions. In addition, it has been found that the plunger lips do not alter or damage the diaphragm bottom surface as it was initially suspected, even though the plunger lip concentrates the actuating pressure on a reduced area. Forming a lip on top of the plungers with a diaphragm-contacting surface that has a surface or area smaller than the disk-area of the plunger head, or smaller than the peripheral area of the top of the plunger, allows reduction flow restriction in the valve, compared to when using plungers having a circular or annular contact surface.

Referring to FIGS. 7 to 10, different embodiments of normally closed plunger assemblies 50 and normally open plunger assemblies 60 are shown. Each of the plungers 70 of the different plunger assemblies have plunger body 708, a plunger head 702 with a top face 704, the top face 704 being provided with a lip 706 protruding thereon. The lip 706, which can also be referred to as a "gate" or "protrusion", is preferably linear, and extends radially across the process groove of the diaphragm. In these exemplary embodiments, the lip 706 extends across the top face 704, such at the lip 706 presses against the diaphragm when the plunger is in the closed position, as will be explained in more detail with reference to FIGS. 5, 5A-5B and 6, 6A and 6B. Preferably, the linear lip 706 is the only portion of the plunger that contacts and presses against the diaphragm when in the closed position, such that the uppermost surface of the plunger 70 corresponds to the diaphragm-contacting surface 724. The lip can be formed with a 90-degree corner, as in FIG. 8E, or can be formed with bevelled corners, as in FIG. 10B. While in the embodiments illustrated the plunger is made of a single integrated part, it can be considered that the plunger be formed of different sub parts. For example, the plunger body and the plunger head can be integrally formed, or consists of two different parts connected to one another, directly or indirectly.

Figure 7A:
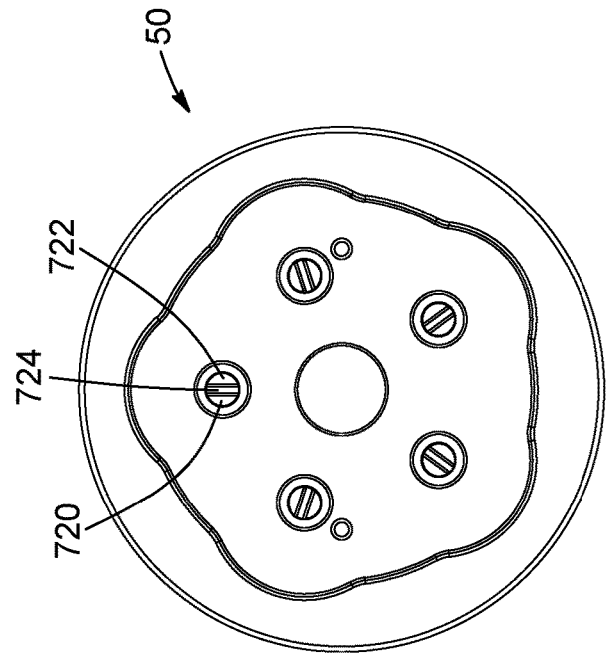
FIG. 7A is a top view of the assembly of FIG. 7.
Figure 7B:
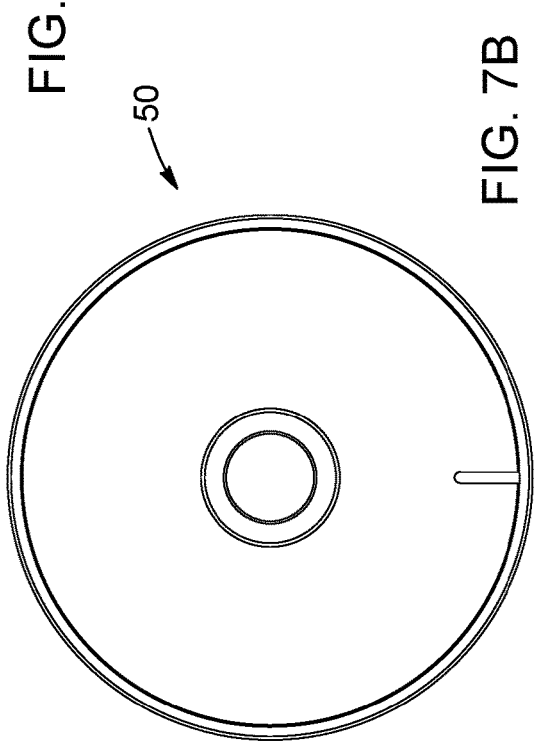
FIG. 7B is a bottom view of the assembly of FIG. 7.

In the exemplary embodiments illustrated, the plunger head 702 extends from the plunger body 708, and both the plunger body 708 and the plunger head 702 are substantially cylindrical in shape. The plunger head 704 has a narrower diameter DHEAD than a diameter of the plunger body 708, DBODY, as shown in FIG. 7D.

Referring now to FIGS. 7D and 7E, and FIGS. 8, 8A and 8E, each plunger 70 comprises a first circular shoulder 710 between the main body and the head of the plunger, and second and third shoulders 712, 714 between the top face 704 of the head of the plunger and opposite sidewalls 716, 718 of the protruding linear lip 706. In these exemplary embodiments, the top face 704 of each plunger 70 comprises two semicircular areas 720, 722 and one rectangular area 724 on said protruding linear lip 706, the rectangular area, which in this case corresponds to the diaphragm-contacting surface 724, being raised and spaced away from the two semicircular areas 720, 722.

Figure 5A:
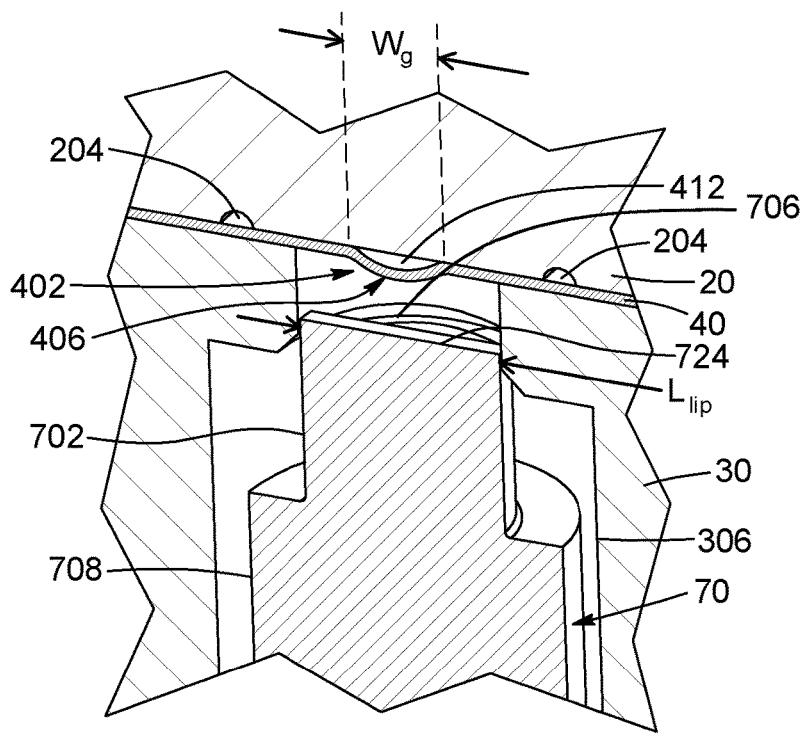
FIG. 5A is a schematic enlarged cross-sectional view of the head of a plunger in an open position, taken along lines 5A-5A in FIG. 5.
Figure 5:
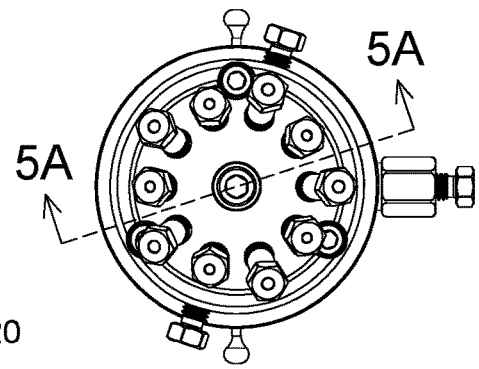
FIG. 5 is a top view of the valve of FIG. 1.
Figure 5B:
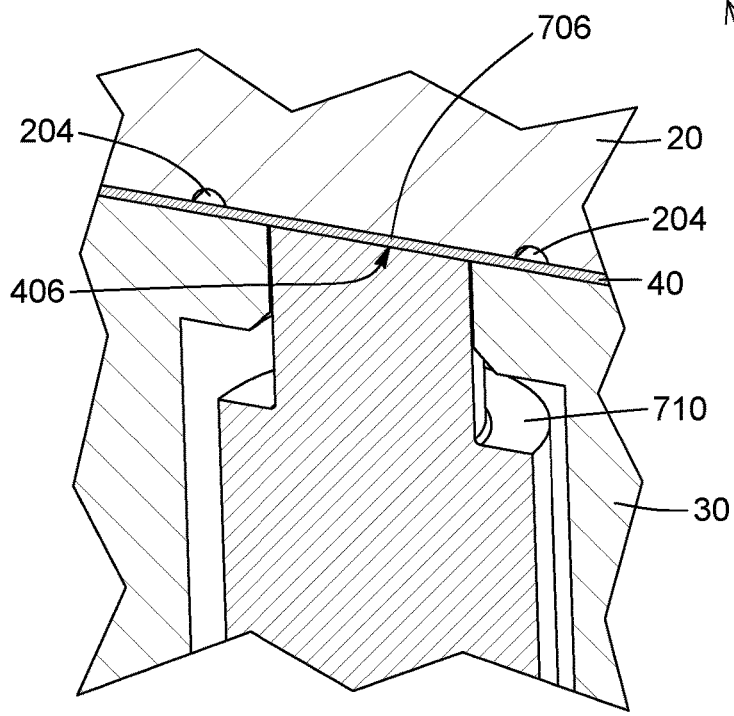
FIG. 5B is a schematic enlarged cross-sectional view of the head of the plunger of FIG. 5A, while pressing against the diaphragm for closing the communication path between two ports.
Figure 6A:
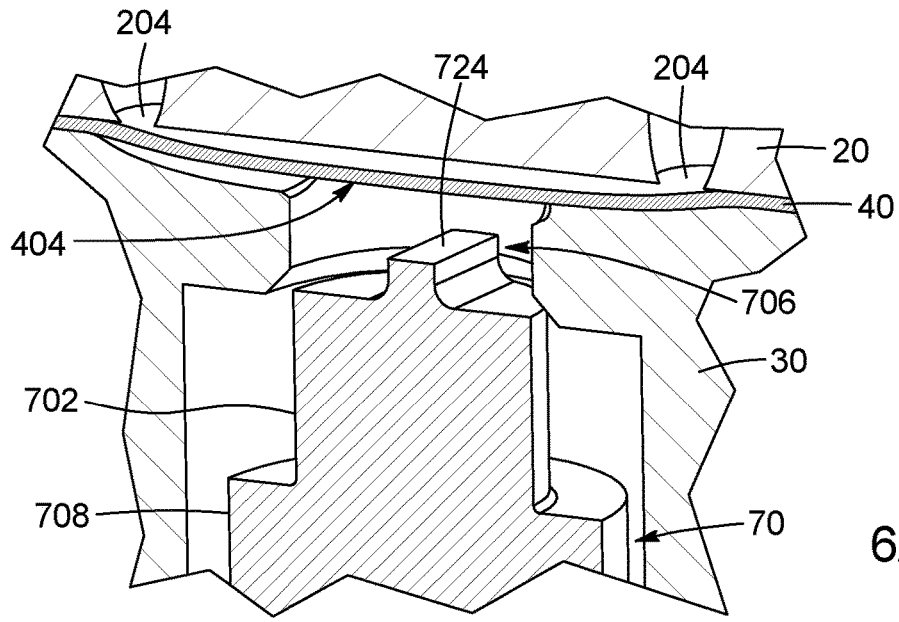
FIG. 6A is a schematic enlarged cross-sectional view of the head of a plunger in an open position, taken along lines 6A-6A in FIG. 6.
Figure 6:
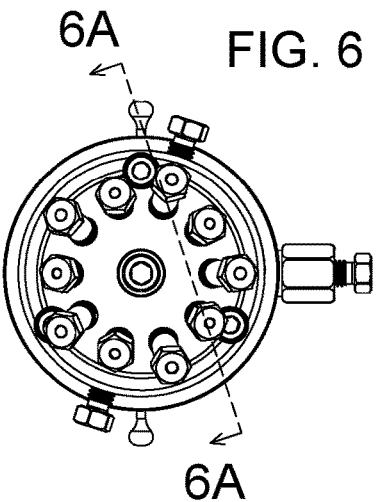
FIG. 6 is a top view of the valve of FIG. 1.
Figure 6B:
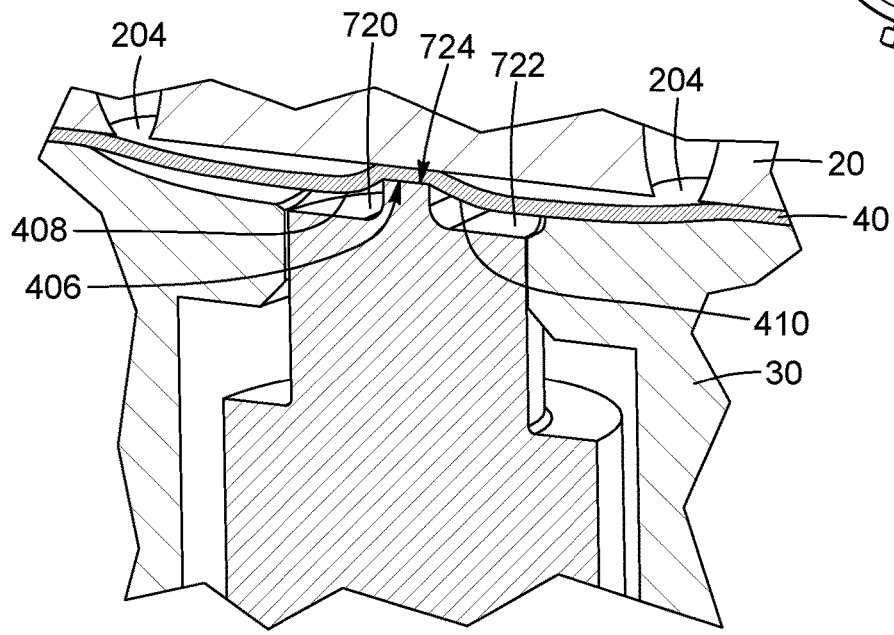
FIG. 6B is a schematic enlarged cross-sectional view of the plunger of FIG. 6A, while pressing against the diaphragm for closing the communication path between two ports.

Referring now to FIGS. 5A and 5B, enlarged cross-sectional views of a plunger, in the closed position and in the open position are shown. FIGS. 5A and 5B are cross-sectional view of the plunger taken along lines 5A-5A in FIG. 5, i.e. taken along the length of the lip 706. FIGS. 6A and 6B are enlarged cross-sectional views of the same plunger but taken at a 90-degree angle relative to the cross-sections of FIG. 5. In the illustrated embodiment, the process groove 402 is an annular process groove having a groove width $W_g$. Preferably, the protruding linear lip 706 extending on top of the plunger 70 has a length $L_{lip}$ substantially corresponding to the width $W_g$ of the process groove. In the embodiment shown, the diameter of the plunger head and lip is greater than the width $W_g$ of the groove (as in FIG. 5A), but in other embodiments, the length of the lip ($L_{lip}$) can be equal or less than the width Wg of the groove.

In the closed position, as in FIGS. 5B and 6B, the protruding linear lip 706 of the plunger 70 presses the contact surface 406 on the bottom surface 404 of the diaphragm 40, deforming the diaphragm such that areas 408, 410 of the diaphragm on each side of the contact surface 406 extend on both sides of the protruding lip 706, in line and facing the recessed areas 720, 722 of the top face of the plunger head 702. The contact surfaces of the diaphragm and of lip 706, corresponding to areas with reference numbers 406 and 724, formed between the plunger and the bottom surface of the diaphragm, extend linearly and radially relative to the central axis of the valve. The lip 706 of the plunger, when in the closed position, thus forms a single gate between two adjacent process ports. This gate formed by the lip radially extending relative to a central axis of the valve. As can be appreciated, the contact surface 724 on the lip of the plunger with the bottom surface 404 of the diaphragm is narrower than an area corresponding to the head of the plunger. The plunger print on the diaphragm is thus reduced compared to existing plungers, which in turn causes less flow restriction in the valve, when the plunger is retracted away toward the open position.

Figure 7:
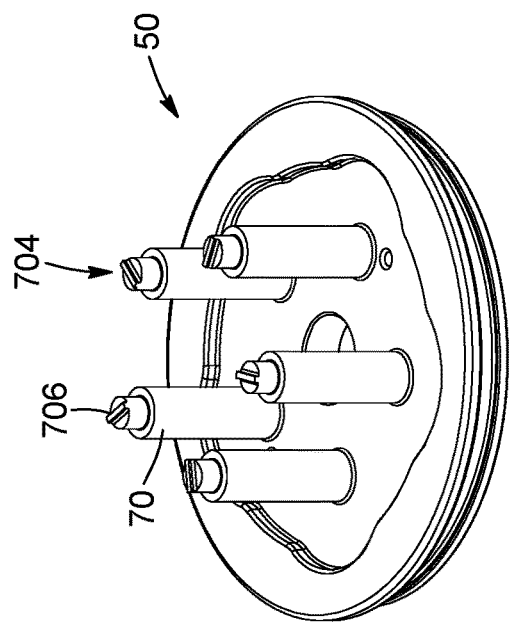
FIG. 7 is a perspective view of a normally open plunger assembly, according to a possible embodiment.

Experiments have been conducted to demonstrate the improved performances of sample injection valve provided with plungers having a protruding lip, as the embodiments shown in FIGS. 7 and 8, over plungers having a circular contact surface. The experiment was conducted by placing a normally closed assembly with plungers provided with linear lips as defined above, and a normally open assembly with plungers provided with standard plungers having a circular contact surface along the periphery of the top end of the plungers. The flow of the gas channeled in the valve was kept constant at 75 scc/min, and the actuating pressure was set to 63 psi. The number of actuating cycles is in thousands of cycles, and the flow was measured for fluid circulating between two adjacent ports, put in communication by closed plungers. The operating temperature was 120° C. For each column, such as 1v10, the flow was measured between two adjacent ports, the type of plungers between the two ports being indicated as "gate" and "normal." The results obtained demonstrate the flow restriction, measured in kPa between two closed ports, is substantially reduced when a plunger of the present invention is used, compared to the restriction measured when a standard plunger is used.

TABLE 1

Flow restriction measured in a valve provided with a NC assembly, in which the plungers are provided with linear lips, and a NO assembly provided with prior art plungers having a circular diaphragm-contacting surface.

| Temp opp | Cycle | 1v10 gate | 1v2 normal | 3v2 gate | 3v4 normal | 5v4 gate | 5v6 normal | 7v6 gate | 7v8 normal | 9v8 gate | 9v10 normal |
|---|---|---|---|---|---|---|---|---|---|---|---|
| ambiant | 0 | 4.6 | 9.1 | 3.7 | 10.4 | 3.7 | 9.6 | 3.4 | 10.1 | 3.9 | 10.1 |
| 120° C. | 0 | 5.1 | 12.4 | 3.7 | 12.6 | 3.7 | 11.3 | 3.6 | 11.3 | 4 | 11.8 |
| 120° C. | 33518 | 4.7 | 12.2 | 3.9 | 13 | 3.9 | 12.2 | 3.6 | 12.5 | 3.9 | 12.8 |
| 120° C. | 222215 | 4.8 | 12.5 | 4 | 14.1 | 4.2 | 13.3 | 3.7 | 13.5 | 4.2 | 13.3 |
| 120° C. | 268165 | 4.5 | 11.2 | 3.6 | 12.9 | 3.6 | 12.3 | 3.2 | 12.6 | 3.7 | 12.6 |
| 120° C. | 313294 | 4.5 | 12.2 | 3.7 | 13.4 | 3.7 | 12.7 | 3.4 | 12.8 | 3.7 | 13.1 |
| 120° C. | 362456 | 4.3 | 11.1 | 3.6 | 12.6 | 3.6 | 12.2 | 3.3 | 12.5 | 3.8 | 12.4 |
| 120° C. | 369124 | 4.2 | 12.8 | 3.3 | 14.3 | 3.4 | 13.2 | 3.2 | 13.3 | 3.5 | 13.1 |
| 120° C. | 410901 | 4.3 | 12.3 | 3.2 | 13.8 | 3.3 | 12.7 | 2.9 | 13.1 | 3.3 | 12.9 |
| ambiant | 410901 | 4.4 | 9.9 | 5.3 | 10.6 | 3.3 | 10.5 | 3.4 | 10.5 | 3.7 | 10.3 |

Leak tests have also been conducted, which can lead to cross-contamination between ports. This phenomenon occurs when the diaphragm is not properly closed by the plungers, and fluid is not completely blocked by the closed plungers. It has been found that leak rates are similar for both types of plungers. Contrary to what has been suspected, the reduced pressing area does not increase leaks in the valve.

Figure 11A:
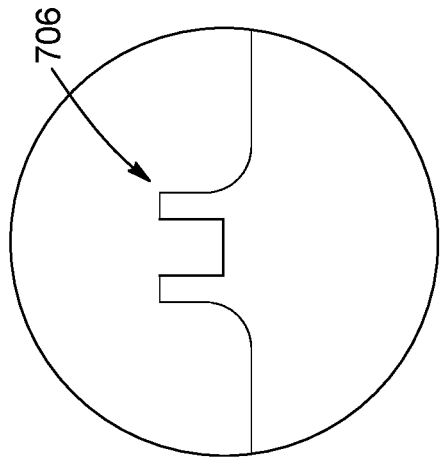
FIGS. 11A-11C are enlarged views of plunger heads, according to other possible embodiments.
Figure 11C:
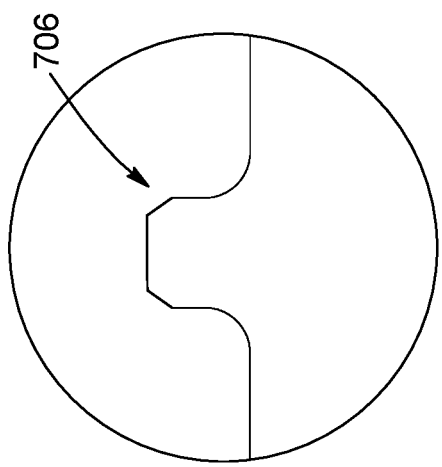
Figure 11B:
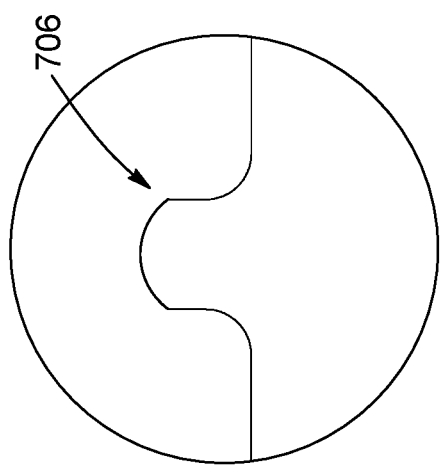
Figure 12B:
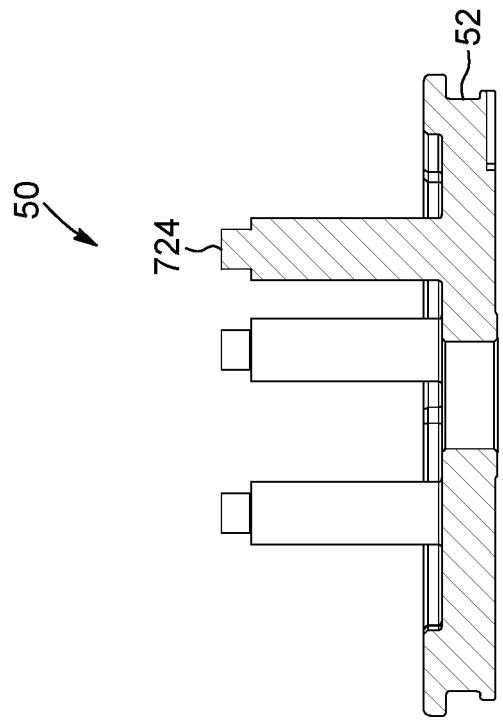
FIG. 12B is a cross-sectional view of the assembly of FIG. 12A, taken along lines 12B-12B in FIG. 12A.
Figure 12A:
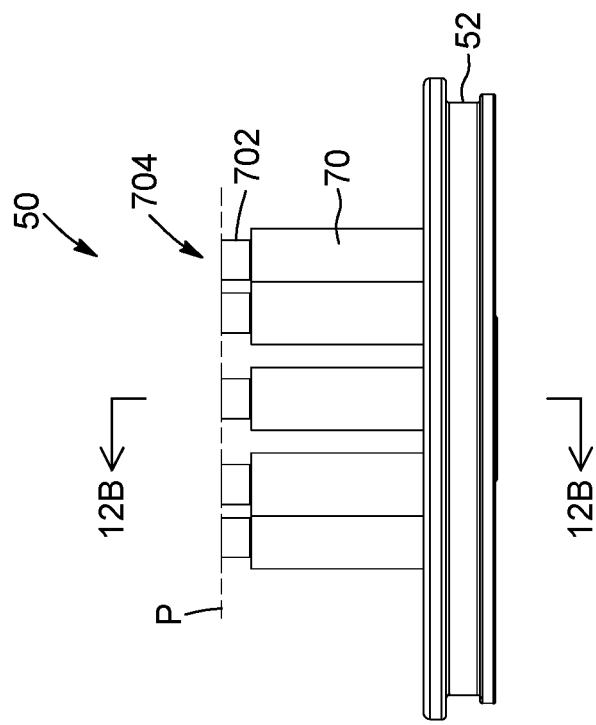
FIG. 12A is a side view of a normally open plunger assembly, according to another possible embodiment.

While in the embodiments illustrated in FIGS. 7 to 10, the uppermost/diaphragm contacting surface is flat, it can be considered to have the lip formed with a concave, convex or double-wall shape, as illustrated in FIGS. 11A to 11C.

Referring to FIGS. 12A-12B and 13A-13C, other embodiments of the NC and NO plunger assemblies 50, 60 are provided. As illustrated, it is possible that the plungers 70 of the normally-closed and normally-open plunger assemblies 50, 60 be integrally formed with the disk or plates 52, 62, without the plungers necessarily including the linear lip. It has been found that when forming the plungers 70 and disk plate 52 or 62 as a single part or component, machining the top surfaces 704 of the plungers such that said top surfaces extend along the same plane P, with all plungers 70 of a given assembly (NC or NO) having the same height, assembly of the valve can be facilitated while providing more consistent sealing characteristics from one plunger to the other. As such, according to possible embodiments, a plunger assembly 50 or 60 for a sample injection diaphragm valve is provided. The plunger assembly comprises a disk plate 52 or 62 and plungers 70 protruding therefrom, the disk plate 52 or 62 and the plurality of plungers 70 being integrally formed as a single part. The plungers 70 are sized and configured to slidably fit in plunger passages of the body of the sample injection valve, each plunger being movable between a closed position wherein the plunger deforms the diaphragm and blocks fluid circulation between two of the process ports and an open position wherein the plunger is retracted away from the diaphragm, allowing fluid to circulate. Each plunger has a plunger head 702 with a top face 704, the top face being provided with a diaphragm-contacting surface for pressing against the diaphragm when the plunger is in the closed position. In such embodiments, in which the NC and NO plunger assemblies are formed as single components, the diaphragm-contacting surface 724 may be linear or circular, for example as shown in FIGS. 11A-11C, the diaphragm-contacting surface may be flat, as in FIGS. 12A and 12B, or can have an annular shape, as in FIGS. 13A-13C.

Referring to FIGS. 1 to 11C, in operation, when the valve is actuated, for example by injecting actuating gas between the lower piston 66 and the upper piston 52, which moves the normally closed plunger assembly 60 toward an open configuration, and simultaneously moves the normally open plunger assembly 50 toward a closed configuration. The plungers of the normally open plunger assembly 50 compresses the diaphragm 40 against the valve head 20 along respective contact areas 724 which are substantially linear, and which extend across the groove width Wg.

Fluid can be circulated from one process conduit, in the process groove 402 of the diaphragm toward another one of the process conduits. The valve is deactivated/unactuated by stopping the actuation gas injection, the normally closed plunger assembly 60 returning in the closed configuration, and the normally open plunger assembly 50 returning in the open configuration. In this state, the plungers 70 of the normally closed plunger assembly 60 compress the diaphragm 40 against the valve head 20 along respective contact areas 724 which are substantially linear, and which extend across the groove width.

Although preferred embodiments of the present invention have been described in detail herein and illustrated in the accompanying drawings, it is to be understood that the invention is not limited to these precise embodiments and that various changes and modifications can be made therein without departing from the present invention.

The invention claimed is:

1. A sample injection diaphragm valve configured for channeling fluid therein, comprising:
a valve head comprising a plurality of process conduits extending therethrough, each of the process conduits ending in a process port;
a valve body facing the valve head, the valve body comprising a body interface provided with a recess, the valve body also comprising plunger passages extending therein, said plunger passages opening on the recess;
a diaphragm positioned between the valve head and the valve body and having a process groove seated in the recess of the valve body, configured for circulating fluid therein; and
a normally closed plunger assembly and a normally open plunger assembly, provided within the valve body, each assembly comprising plungers slidably fitted in the plunger passages of the valve body, each plunger being movable between a closed position wherein each plunger deforms the diaphragm and blocks fluid circulation between two of the process ports, and an open position wherein each plunger is retracted away from the diaphragm, allowing fluid to circulate, each plunger having a head with a top face, each top face being provided with a linear lip protruding thereon and extending thereacross, at least a portion of each linear lip pressing against the diaphragm when each plunger is in the closed position.

2. The sample injection diaphragm valve according to claim 1, wherein each of the plungers comprises a plunger body and a plunger head, each plunger head extending from a corresponding one of the plunger body, each plunger body and each plunger head being both substantially cylindrical in shape, each plunger head having a narrower diameter than a diameter of each plunger body.

3. The sample injection diaphragm valve according to claim 1, wherein each of the plungers comprises a first circular shoulder between a main body and each head of each plunger, and second and third shoulders between each top face of each head of each plunger and opposites sidewalls of each protruding linear lip.

4. The sample injection diaphragm valve according to claim 1, wherein each top face of each plunger comprises two semicircular areas and one rectangular area on each protruding linear lip, each rectangular area being raised and spaced away from each of the two semicircular areas.

5. The sample injection diaphragm valve according to claim 1, wherein the process groove is an annular process groove having a groove width, and wherein each protruding linear lip extending on top of each plunger has a length corresponding to the width of the process groove.

6. The sample injection diaphragm valve according to claim 1, wherein in the closed position, the protruding linear lip of each plunger presses a contact surface on the bottom surface of the diaphragm, deforming the diaphragm such that areas of the diaphragm on each side of the contact surface extend on both sides of the protruding lip, in line with recessed areas of each top face of each plunger head.

7. The sample injection diaphragm valve according to claim 1, wherein in the closed position, contact surfaces formed between the plungers and the bottom surface of the diaphragm extend linearly and radially relative to a central axis of the valve.

8. The sample injection diaphragm valve according to claim 1, wherein both the normally closed plunger assembly and the normally open plunger assembly comprise disk plates, the plungers of a given one of the assemblies extending from the corresponding disk plate.

9. The sample injection diaphragm valve according to claim 8, wherein the disk plates are stacked one on the other in the valve body, one of said normally closed and normally open plunger assemblies having its disk plate provided with plunger holes extending therethrough, for letting plungers of the other assembly pass therethrough.

10. The sample injection diaphragm valve according to claim 1, wherein the linear lip of each plunger, when in the closed position, forms a single gate between two adjacent process ports, said gate or sidewall radially extending relative to a central axis of the valve.

11. The sample injection diaphragm valve according to claim 1, wherein the linear lip of each plunger, when in the closed position, creates a contact surface with a bottom surface of the diaphragm, said contact surface being narrower than an area corresponding to each head of each plunger.

12. The sample injection diaphragm valve according to claim 1, wherein each linear lip has a flat diaphragm-contacting surface.

13. The sample injection diaphragm valve according to claim 1, wherein each linear lip has one of a concave, convex or double-wall shape.

14. The sample injection diaphragm valve according to claim 1, wherein the valve is pneumatically actuated, the valve comprising a valve bottom cap, providing a closed chamber for actuating gas.

15. A plunger assembly configured for a sample injection diaphragm valve, the valve having a valve head and a valve body, the valve body being provided with a plurality of passages extending therein and opening on a recess of the valve body, the valve including a diaphragm positioned between the valve head and the valve body and having a process groove seated in the recess of the valve body, configured for circulating fluid therein, said plunger assembly comprising:

plungers configured for slidably fitting in the plunger passages of the valve body, wherein in use, each plunger is movable between a closed position wherein each plunger deforms the diaphragm and blocks fluid circulation between two of the process ports and an open position wherein each plunger is retracted away from the diaphragm, allowing fluid to circulate, each plunger having a head with a top face, each top face being provided with a linear lip protruding thereon and extending thereacross, each linear lip pressing against the diaphragm when each plunger is in the closed position.

16. The plunger assembly according to claim 15, wherein the plunger assembly is one of normally closed or normally open, said plunger assembly comprising a disk plate, the plungers extending from said disk plate.

17. The plunger assembly according to claim 15, wherein each plunger comprises a main body, each head of each plunger extending from a corresponding one of the main body, each main body and each head being both substantially cylindrical in shape, each head having a narrower diameter than a diameter of each main body of each plunger.

18. The plunger assembly according to claim 15, comprising a first circular shoulder between each main body and each head of each plunger, and second and third shoulders between opposites sides of each head and each protruding linear lip.

19. The plunger assembly according to claim 15, wherein each top face of each plunger comprises two semicircular areas and one rectangular area on each protruding linear lip, each rectangular area being raised and spaced away from each of the two semi-circular areas.

20. A method of operating a sample injection diaphragm valve, the method comprising:
a) providing the valve with:
  a valve head comprising a plurality of process conduits extending therethrough, each of the process conduits ending in a process port;
  a valve body facing the valve head, the valve body comprising a body interface provided with a recess, the valve body also comprising plunger passages extending therein, said plunger passages opening on the recess;
  a diaphragm positioned between the valve head and the valve body and having a process groove seated in the recess of the valve body, configured for circulating fluid therein, the process groove having a groove width; and
  a normally closed plunger assembly and a normally open plunger assembly, each assembly comprising plungers slidably fitted in the plunger passages of the valve body, each plunger being movable between a closed position to block fluid circulation between two of the ports, and an open position to allow fluid to circulate in the process groove between two of the ports; and
b) actuating the valve by moving the normally closed plunger assembly toward an open configuration, and simultaneously moving the normally open plunger assembly toward a closed configuration; the plungers of the normally open plunger assembly compressing the diaphragm against a cap valve along respective contact areas which are substantially linear, and which extend across the groove width.

* * * * *